June 15, 1965 D. V. KNIEBES 3,188,836
GAS CONTROL MECHANISM
Filed Oct. 15, 1962
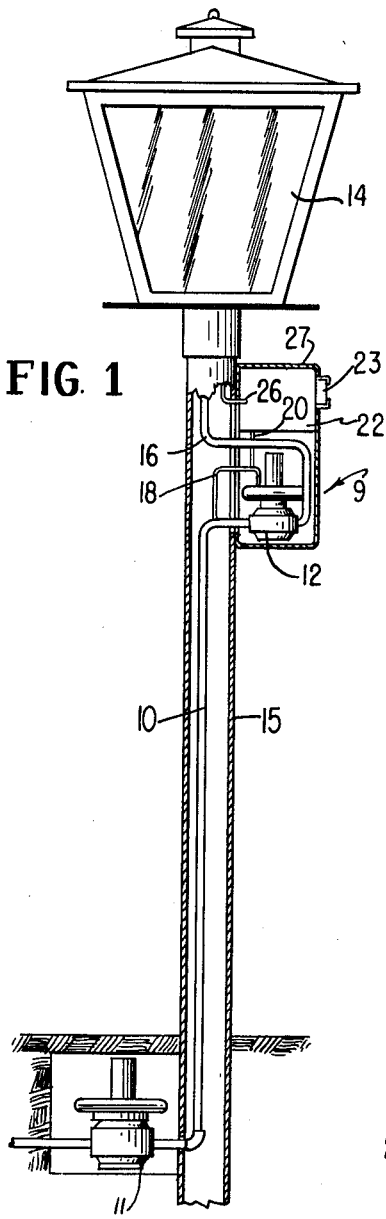
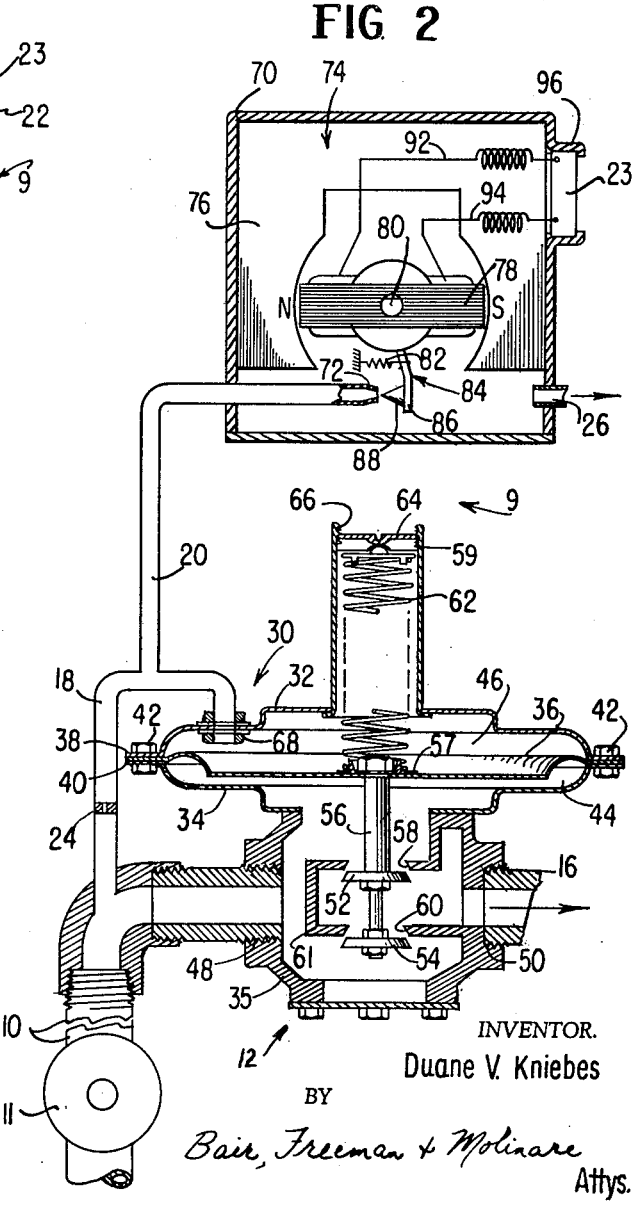
INVENTOR.
Duane V. Kniebes
BY
Bair, Freeman & Molinare
Attys.

United States Patent Office 3,188,836
Patented June 15, 1965

3,188,836
GAS CONTROL MECHANISM
Duane V. Kniebes, Hinsdale, Ill., assignor to Institute of Gas Technology, a corporation of Illinois
Filed Oct. 15, 1962, Ser. No. 230,499
9 Claims. (Cl. 67—119)

This invention relates to gas control mechanism and, more particularly, to an automatic gas control mechanism for turning down a gas light during daylight hours and for turning up the gas light at night.

Gas lights have staged a comeback and are being utilized in a number of suburban communities because of the considerable charm which they add to the homes in the community. Use today is limited because of the relatively high initial cost of the gas light, due in part to the complexity of the gas control mechanism for the gas light and in part to the relatively high cost of installation caused by the present requirement that a separate source of electrical power be supplied to actuate the control in the gas control mechanism. Among the design criteria for an improved gas light are completely automatic operation thereof, provision of a gas control mechanism having a self-contained source of electrical power for actuating a control therein, and simplicity of design so that the gas control mechanism will be reliable in operation and relatively free of maintenance.

An object of the present invention is to provide an improved automatic gas control mechanism wherein the disadvantages and the deficiencies of prior gas control mechanisms are obviated.

Another object of this invention is to provide an automatic gas control mechanism which is relatively simple in design and which does not require an external power source.

Still another object of the present invention is to provide an improved automatic gas control mechanism including a pressure operated valve and a control therefor operated automatically in response to the environmental light sensed by a solar cell.

Yet another object of this invention is to provide an improved method of operating a gas control mechanism for a gas lamp.

These and other objects of the present invention, which will become hereafter apparent, are obtained by providing a gas control mechanism having a pressure operated valve for controlling the flow of gas to a gas lamp from a suitable source, such pressure operated valve comprising a housing means having a diaphragm therein defining a first chamber and second chamber. The first chamber has a gas inlet and a gas outlet. First conduit means communicate the gas inlet with the gas source. Valve means, operatively connected to the diaphragm for movement therewith, are adapted to control gas flow through the first chamber from the gas inlet to the gas outlet. Spring means are provided in the housing means to bias the valve means toward open position. The gas control mechanism includes a control device comprising an enclosure. Second conduit means communicate the enclosure and the second chamber of the housing means with the first conduit means. Restriction means are provided to reduce the pressure of the gas passing through the second conduit means. The second conduit means have an orifice therein disposed within the enclosure. Also provided in the enclosure are photoelectric means and a galvanometer having a pivoted spring-biased coil connected in circuit with the photoelectric means. Orifice-regulating means including a control lever having a cammed portion thereon are mounted for movement with the coil and are adapted to vary the size of the orifice within the enclosure to regulate the quantity of gas discharged into the enclosure and thus the gas pressure in the second chamber. Third conduit means extend from the enclosure to the gas lamp to provide a pilot light therefor.

Thus, a relatively constant valve-closing force is exerted upon one side of the diaphragm by the flowing gas and a relatively constant biasing force is exerted upon the diaphragm tending to open the valve. A variable gas pressure is exerted on the other side of the diaphragm in response to the quantity of light sensed by the photoelectric means to move the diaphragm and thereby regulate movement of the valve means to control gas flow through the pressure operated or pressure responsive valve.

The novel structural components and their mode of functioning will be made most manifest and particularly pointed out in clear, concise and exact terms in conjunction with the accompanying drawing, wherein:

FIGURE 1 is an elevational view of a gas lamp, partly in section, embodying the gas control mechanism of the present invention; and FIGURE 2 is an enlarged cross-sectional view of the gas control mechanism of the present invention.

Referring to FIGURE 1, there is shown a gas lamp 14 having affixed on the support 15 thereof the gas control mechanism 9 of the present invention. Gas is supplied to the gas lamp 14 from a suitable source via conduit means 10. The gas is maintained at a relatively constant pressure by regulator 11 in conduit means or line 10. Regulator 11, which may be mounted adjacent the base of the support 15 or at a remote location, may be a conventional diaphragm-type pressure regulator.

Gas passes through line 10 to the gas control mechanism 9 and then to the gas lamp 14 via conduit means or line 16 and pilot line 26. The gas control mechanism 9 comprises essentially a pressure operated diaphragm type valve 12 and a control 22. The main components of the mechanism may be constructed separately and enclosed within protective casing 27 affixed to support 15 or, if desired, these components may be formed as an integral structure.

At one end, bypass line 18 communicates with conduit means 10 upstream of the pressure operated valve 12. At the other end, bypass line 18 communicates with the conduit means 20, which connects the pressure operated valve 12 with the control 22. Provided within the conduit means or bypass line 18 is a restriction means or orifice for reducing the flow of the gas through line 18.

The control 22 is provided with a self-contained electrical power source, photoelectric means 23, which is preferably a sun-battery or solar cell.

Pilot line 26 communicates the control 22 with the gas lamp 14 and is adapted to provide a pilot light within the gas lamp 14 for igniting the gas lamp.

Referring now to FIGURE 2, there is disclosed an enlarged view partially in cross-section of the gas control mechanism 9. The housing means 30 of the pressure operated or pressure responsive valve comprises a first member 32 and a second member 34, between which is connected a flexible diaphragm 36 and a valve body member 35. The first and second members 32 and 34, respectively, each have a flange 38 and 40, respectively, thereon, such flanges being connected by suitable fastening means, as for example, a nut and bolt arrangement 42. The flexible diaphragm divides the housing 30 into a first chamber 44 and a second chamber 46.

Provided in the member 35 defining a part of housing 30 is an inlet 48 which communicates with the conduit 10 and an outlet 50 which communicates with the conduit 16. Valve means are provided for controlling the flow of gas through the first chamber in the pressure responsive valve. Such means comprise valve members 52 and 54 which are interconnected by a stem 56 and are adapted to be connected to the flexible diaphragm 36 for movement therewith. The valve members seat against seats 58 and 60 defined in the wall portion 61 of the housing member 35.

Means are provided for biasing the valve means to the open position. Such means preferably comprise a coil spring 62 provided in the second chamber 46 in housing 30 and adapted to operate between the plate 57 secured to the valve stem 56 and the flange member 59 adjacent the top of the housing member 32. It is preferable that the spring tension or compression be adjustable and this may readily be accomplished by providing a threaded cap member 64 in the threaded bore 66 in the housing member 32. Obviously, a compression spring may be provided in chamber 46 or a tension spring may be provided in chamber 44.

Within the housing member 32 there is provided an inlet 68 which is in communication with the conduit 20.

Control 22 comprises a housing 70 which is adapted to be supplied with gas at a reduced pressure from the line 18. Gas enters the enclosure or housing 70 through the end of conduit 20, which has an orifice 72 therein.

Also provided with the enclosure 70 is a conventional galvanometer indicated generally at 74. The galvanometer comprises a permanent magnet 76 fixed within the housing 70. Provided between the pole pieces of the permanent magnet is a pivoted coil 78 rotatably mounted in the housing on shaft 80. Secured to the shaft 80, which is spring-biased to a neutral position by spring 82, is a control means 84 for regulating the size of orifice 72 and for controlling the discharge of gas flowing into the enclosure or housing 70 through the orifice 72. Such control means comprise an arm 86 fixedly connected to the shaft 80 and a cam member 80 adapted to vary the size of the orifice 72.

Affixed on the housing 70 in communication with the ambient air thereabout is a photoelectric means 23, which is electrically connected to the movable coil 78 by means of leads 92 and 94. Such photoelectric means comprise a solar cell or sun-battery. The term "solar cell" designates a battery comprising one or more photovoltaic cells. Such cells produce at their terminals a predetermined potential responsive to the incidence of light waves. Thus, the photoelectric means 23 provide a self-contained source of electrical power for the gas control mechanism 9.

A shield 96 may be provided on the enclosure 70 about the solar cell 23 to prevent interference with solar cell operation because of incidental light from the gas lamp.

*Operation*

The flow of gas to the gas lamp 14 from a source of gas (not shown) is automatically regulated by a gas control mechanism 9 comprising a pressure operated valve 12 and a control 22. Though in the present description, the pressure operated valve 12 and the control 22 are illustrated as separate components, it will be understood by those persons skilled in the art that they could be readily fabricated as an integral unit. The flow of gas through the pressure operated valve 12 is controlled by the valve means in response to movement of the flexible diaphragm 36. Regulator 11 maintains a relatively constant gas pressure in the lower chamber or first chamber 44. The pressure within the first chamber acts upon the lower side of the flexible diaphragm 36 and urges the valves 52 and 54 toward closed position. Acting in an opposite direction on the flexible diaphragm 36 is a coil spring 62, which urges the valves 52 and 54 to the open position. By virtue of maintaining a relatively constant gas pressure in the first chamber 44 and maintaining a relatively constant spring pressure upon the diaphragm exerting a force tending to open the valve, it is possible to control the opening and closing of the valve means by adjustment of the gas pressure in the second chamber 46. Thus, the purpose of the control 22 is to regulate the gas pressure within the chamber 46 and thus effectively regulate the operation of the valves.

Gas is supplied to the control 22 at a reduced pressure through the restriction or orifice 24 in the line 18. The gas passes through line 18 and into line 20 from whence part of the gas is discharged through the orifice 72 at the end of the conduit 20 into the gas-tight enclosure 70. Since the pressure of the gas was reduced upstream of the orifice 72 by the orifice 24, the pressure existing between the two orifices is intermediate between the incoming gas pressure and that in the control enclosure 70. This intermediate or control pressure can be adjusted by selection of appropriate orifice sizes. An example of typical pressures in one form of the present invention would be as follows: Incoming gas pressure, five inches of water column; intermediate pressure, two inches of water column; and control pressure, one inch of water column.

If orifice 72 were reduced in size, it is evident that the pressure between the orifices 72 and 24 and also in the chamber 46 would increase.

The control 22 contains mechanism for reducing the size of orifice 72 by insertion of a cam member or needle 88 into the orifice opening 72, thereby reducing the rate of gas flow and causing a pressure increase in the upper chamber or second chamber 46 of the regulator. Withdrawal of the needle or cam member 88 from the orifice opening will cause a pressure reduction in the chamber 46. The spring pressure on the diaphragm 36 may be manually adjusted to a point where the two pressure levels will open and close the valve means in the chamber 44 to control the flow of gas through the chamber.

The regulation of the size of orifice 72 is controlled electrically, inasmuch as the control means 84 are constructed and arranged to move with the pivoted coil 78 of the galvanometer 74. The current to operate the meter movement is obtained from the solar cell 23 which generates electrical current upon exposure to light.

When in use on a gas lamp, the solar cell 23 is shielded from the light of the glowing mantle and from other lights in the vicinity by means of a shield member 96.

At night, the solar cell 23 is de-energized and the control needle 88 is positioned such that the spring return of the galvanometer keeps the needle 88 in the opening of the orifice 72, which results in sufficient pressure in the chamber 46 to keep the valve means open, allowing gas flow to the gas lamp 14.

When sunlight falls on the solar cell, sufficient electrical power is developed to deflect the galvanometer coil 78, thereby causing the control means 84 to move, withdrawing the needle 88 from the orifice 72. Gas pressure can pass from chamber 46 to the enclosure 70. This causes a pressure reduction in the chamber 46 to the point where the pressure in the chamber 44 overcomes the combined pressure of the gas in the chamber 46 and the pressure of the spring 62 causing the valve means to close, shutting off the flow of gas to the gas lamp and extinguishing the light.

The present invention envisions an improved method of operating a gas control mechanism for regulating the flow to a gas lamp comprising a pressure operated valve including valve means actuated in response to diaphragm movement and a control therefor, such method comprising the steps of exerting a substantially constant gas line pressure against one side of the diaphragm tending to close the valve means, exerting a substantially constant biasing force tending to open the valve means, and exerting a variable gas pressure against the other side of the diaphragm in response to the quantity of light sensed by a photoelectric means to move the diaphragm and thereby regulate movement of the valve means.

Gas flowing into the enclosure 70 is discharged through pilot line 26 into the gas lamp and provides an ignition source for the gas lamp when it is turned on again after dark.

By the present invention, there has been provided an automatic gas control mechanism which is operable to control a relatively large gas flow with the use of very little power, for example, on the order of a tenth of a milliwatt. Thus, the operating cost of gas control mechanisms has been reduced. The gas control mechanism is relatively inexpensive and is simple in construction.

Though the galvanometer illustrated is a moving coil type mechanism, it is apparent that other galvanometers may be employed. A satisfactory galvanometer would be one having a pair of disc magnets on the center staff or shaft and fixed coils surrounding them. The return-to-zero force on this device could be magnetic rather than spring.

While there has been shown and described an illustrative embodiment of this invention, it will be obvious to those skilled in the art that various changes and modifications may be made therein without departing from the inventive concept. For example, the upper regulator chamber 46 may be open to a housing within which is mounted the galvanometer. The orifice 24 bleeds gas into the housing and orifice 72 is located at the entrance to pilot line 26. The control 84, therefore, operates on the same orifice in the same manner, but tubing connections inside the housing are eliminated.

In addition, the invention can be used to control multiple gas lights by appropriate sizing of the control valve and the piping connections. The gas control mechanism can also be connected so as to operate a gas light in a blinking manner, such as used in gas light illuminated signs for commercial advertising. This function can be accomplished by permitting the gas light to activate the solar battery. The frequency of the on-off cycle can be controlled by appropriate electrical circuiting (addition of a capacitor across lines 92 and 94), and/or adjustment of housing volume to modify the rate of pressure change over the control diaphragm.

Therefore, it is intended that the appended claims cover all such changes and modifications as fall within the true spirit and scope of the invention.

I claim:
1. In combination, a gas lamp, a pressure operated valve for controlling the flow of gas to said gas lamp from a gas source, said pressure operated valve comprising housing means having a diaphragm therein defining a first chamber and a second chamber, said first chamber having a gas inlet and a gas outlet, first conduit means communicating said gas inlet with the gas source, valve means operatively connected to said diaphragm for movement therewith and adapted to control the gas flow through the first chamber from said gas inlet to said gas outlet, spring means in said housing means biasing the valve means toward open position, a control device comprising an enclosure, second conduit means communicating said enclosure which said first conduit means, said second conduit means having an orifice therein disposed within said enclosure, photoelectric means disposed in position to respond to daylight, a galvanometer having a pivoted spring-biased coil in said enclosure and connected in circuit with said photoelectric means, a control lever in said enclosure mounted for movement with said coil having a portion thereof disposed adjacent said orifice to vary the size thereof, third conduit means communicating the second chamber of said housing with said second conduit means, and means including a conduit extending from said enclosure to said gas lamp to provide a pilot light therein, whereby, when the photoelectric means are deactuated, the control lever is moved, reducing the area of the orifice, causing an increase of pressure in the second chamber in the housing to move the diaphragm and thereby move the valve means to permit gas flow between the gas inlet and the gas outlet, and when the photoelectric means are actuated, the control lever is moved to increase the area of the orifice, permitting the gas pressure against the diaphragm in the first chamber in the housing means to overcome the combined effective force of the gas pressure in the second chamber and the biasing force of the spring, thereby closing the valve means and terminating gas flow from the gas inlet to the gas outlet.

2. Apparatus as in claim 1, including an orifice in said third conduit means to reduce the gas pressure supplied to said enclosure and said second chamber in said housing means.

3. Apparatus as in claim 1, wherein said photoelectric means is a solar cell and means are provided for shielding the solar cell from undesirable light.

4. Gas control mechanism for controlling the flow of gas comprising a pressure operated valve having a flexible diaphragm therein defining a first chamber and a second chamber, said first chamber having a gas inlet adapted to communicate with a source of gas, and a gas outlet adapted to communicate with a gas lamp, valve means in said first chamber for controlling the gas flow from said gas inlet to said gas outlet, means for operatively connecting said diaphragm to said valve means, spring means in the pressure operated valve for biasing the valve means toward open position, an enclosure communicating with said second chamber and adapted to communicate with said source of gas through an orifice means, photoelectric means disposed in position to respond to daylight, a galvanometer in said enclosure having a pivoted spring-biased coil in circuit with said photoelectric means, orifice-regulating means in said enclosure mounted for movement with said coil and having a portion thereof disposed adjacent said orifice means in said enclosure for controlling the orifice opening, whereby control of the orifice opening controls the pressure in the second chamber, thereby controlling movement of the diaphragm to actuate the valve means.

5. Gas control mechanism as in claim 4, including pressure-reducing means for reducing the pressure of the gas introduced into the enclosure.

6. Gas control mechanism as in claim 4, including an outlet in said enclosure for communicating gas to the pilot for a gas lamp.

7. In a gas control mechanism, the combination comprising a pressure operated valve having a diaphragm therein defining a first chamber adapted to communicate with gas at line pressure and a second chamber adapted to communicate with gas at a reduce pressure, said pressure operated valve having an inlet to and an outlet from said first chamber, valve means operatively connected to said diaphragm for controlling the flow of gas through the first chamber from said inlet to said outlet, means for biasing the valve means toward the open position, and control means for regulating the gas pressure in the second chamber comprising an enclosure in communication with said second chamber, means communicating said enclosure and said second chamber with gas at a reduced perssure, said communicating means having a restricted outlet within said enclosure, photoelectric means comprising a solar cell constructed and arranged to sense daylight, a coil in circuit with said solar cell and driven in one direction by said photoelectric means, spring means for biasing said coil in an opposite direction and cam means movable with said coil for regulating the size of the restricted outlet within the enclosure and thereby controlling the pressure in said second chamber.

8. A method of operating a gas control mechanism for regulating the flow of gas to a gas lamp comprising a pressure operated flow controller including valve means actuated in response to diaphragm movement and a control therefor, said method comprising the steps of exerting a susbtantially constant gas line pressure against one side of said diaphragm tending to close the valve means, exerting a substantially constant biasing force tending to open the valve means, and exerting a variable gas pressure against the other side of said diaphragm in response to the quantity of light sensed by a photoelectric means to move the diaphragm and thereby actuate the valve means.

9. The method of claim 8, including the steps of bypassing a portion of the gas supplied to said one side of said diaphragm, reducing the pressure of the bypassed gas, regulating the discharge of bypassed gas to a bleed control that is responsive to the quantity of light sensed by a photoelectric cell.

References Cited by the Examiner

UNITED STATES PATENTS

| | | | |
|---|---|---|---|
| 1,155,496 | 10/15 | Lindbolm | 158—28 |
| 2,228,588 | 7/41 | Ray | 158—123 |
| 2,417,994 | 3/47 | Sheets | 158—129 X |
| 2,587,733 | 3/52 | Jones | 158—28 |
| 2,608,678 | 8/52 | Marchment et al. | 158—28 |
| 2,957,518 | 10/60 | Ray | 158—129 |
| 3,046,406 | 7/62 | Dietiker | 67—110 X |
| 3,063,278 | 11/62 | Van Tubergen et al. | 67—87 |

FOREIGN PATENTS 408,414  12/44  Italy.

EDWARD J. MICHAEL, *Primary Examiner.*

FREDERICK L. MATTESON, Jr., *Examiner.*